US012324509B2

(12) United States Patent
Terai

(10) Patent No.: US 12,324,509 B2
(45) Date of Patent: Jun. 10, 2025

(54) MUSIC RACK UNIT-MOUNTING STRUCTURE OF GRAND PIANO

(71) Applicant: KABUSHIKI KAISHA KAWAI GAKKI SEISAKUSHO, Hamamatsu (JP)

(72) Inventor: Yasushi Terai, Hamamatsu (JP)

(73) Assignee: KABUSHIKI KAISHA KAWAI GAKKI SEISAKUSHO, Hamamatsu (JP)

( * ) Notice: Subject to any disclaimer, the term of this patent is extended or adjusted under 35 U.S.C. 154(b) by 0 days.

(21) Appl. No.: 18/599,035

(22) Filed: Mar. 7, 2024

(65) Prior Publication Data

US 2024/0306810 A1 Sep. 19, 2024

(30) Foreign Application Priority Data

Mar. 17, 2023 (JP) ................................ 2023-042725

(51) Int. Cl.

| | |
|---|---|
| ***A47B 23/00*** | (2006.01) |
| ***G10C 1/04*** | (2006.01) |
| ***G10C 3/00*** | (2019.01) |
| ***G10G 7/00*** | (2006.01) |

(52) U.S. Cl.

CPC .............. *A47B 23/004* (2013.01); *G10C 1/04* (2013.01); *G10C 3/00* (2013.01); *G10G 7/00* (2013.01)

(58) Field of Classification Search

CPC .......... A47B 23/004; G10C 1/04; G10C 3/00; G10G 7/00

See application file for complete search history.

(56) References Cited

U.S. PATENT DOCUMENTS

| | | | | |
|---|---|---|---|---|
| 2,133,368 A * | 10/1938 | Wallace | A47B 23/004 84/180 |
| 7,009,095 B2 * | 3/2006 | Ichikawa | G10G 7/00 84/177 |
| 9,468,291 B2 * | 10/2016 | Nilsen | A47B 23/02 |
| 10,796,675 B1 * | 10/2020 | Turney | A47B 23/004 |

FOREIGN PATENT DOCUMENTS

| | | |
|---|---|---|
| JP | 2000-181442 A | 6/2000 |

* cited by examiner

*Primary Examiner* — Anita M King

(74) *Attorney, Agent, or Firm* — WOMBLE BOND DICKINSON (US) LLP

(57) ABSTRACT

A music rack unit-mounting structure of a grand piano, for removably mounting a music rack unit on a piano body of the grand piano. Rear ends of a left-side engagement portion and a right-side engagement portion are configured to be capable of being placed on front ends of a left-side guide portion and a right-side guide portion from above, respectively, when the music rack unit is mounted on the piano body from the front. By sliding the music rack unit rearward from the placed state, the music rack unit is mounted on the piano body, while the left-side engagement portion and the right-side engagement portion are fitted on or in the left-side guide portion and the right-side guide portion, respectively.

5 Claims, 5 Drawing Sheets

MUSIC RACK UNIT-MOUNTING STRUCTURE OF GRAND PIANO

CROSS-REFERENCE TO RELATED APPLICATION

This application claims priority to Japanese Patent Application Number 2023-042725, filed on Mar. 17, 2023, the entire content of which is incorporated herein by reference.

BACKGROUND OF THE INVENTION

Field of the Invention

The present invention relates to a music rack unit-mounting structure of a grand piano, for removably mounting a music rack unit on a piano body.

Description of the Related Art

Conventionally, as this type of a music rack unit-mounting structure of a grand piano, there has been known, for example, one disclosed in Japanese Laid-Open Patent Publication (Kokai) No. 2000-181442 already filed by the present applicant. The music rack unit of the structure includes a laterally elongated music rack, two (left and right) music rack-holding boards disposed on respective lateral sides of the music rack, two (front and rear) music rack-holding bars fixed between the two (left and right) music rack-holding boards, and a music rack prop pivotally mounted to a rear surface of the music rack.

Further, each of the left and right music rack-holding boards has a symmetrical shape with a predetermined thickness, and a lateral outer edge thereof is formed with an outer edge protrusion which extends in a front-rear direction and is formed into a protruding shape protruding outward. On the other hand, a piano body of the grand piano has a pair of left and right guide members formed at a front end of an inner surface of a side panel thereof. Each guide member is formed into a block shape extending in the front-rear direction, and is formed with a guide groove which opens toward the inside and front of the piano body and extends in the front-rear direction.

When the music rack unit configured as described above is mounted on the piano body, the left and right music rack-holding boards are brought closer to the left and right guide members from the front side of the piano body while being held substantially horizontally. Then, the outer edge protrusion of each of the left and right music rack-holding boards is inserted from the front into the guide groove of an associated one of the guide members, whereafter the music rack unit is slid toward the depth side (rearward). With this, the music rack unit is mounted on the piano body via the left and right music rack-holding boards in a state engaged with and supported by the pair of left and right guide members of the piano body. Note that the music rack unit is configured such that it be easily mounted on and removed from the piano body as required, and when it is not needed, it can be easily removed from the piano body by being pulled forward out of the piano body.

The music rack unit-mounting structure described above suffers from the following problem: To mount the music rack unit on the piano body, it is necessary to align the heights of the left and right music rack-holding boards to the heights of associated ones of the left and right guide members of the piano body while holding the music rack unit in a substantially horizontal posture. What is more, it is required to insert a rear end of the outer edge protrusion of each of the left and right music rack-holding boards into the guide groove of an associated one of the guide members from the front.

In general, the music rack unit of the grand piano has a relatively large weight and a long distance between the two outer edge protrusions of the left and right music rack-holding boards. For this reason, when a worker performs work for mounting the music rack unit alone, the worker is required, while holding the music rack unit with his/her hands, to insert the rear end of the outer edge protrusion of each of the left and right music rack-holding boards into the guide groove of the associated one of the guide members from the front by repeatedly visually confirming positions of the left and right outer edge protrusions and the guide grooves of the two guide members, which makes the work very troublesome. Further, although a vertical width of the guide groove of each guide member is larger than a height dimension of the outer edge protrusion of an associated one of the left and right music rack-holding boards, there is not a large dimensional allowance, and hence when the music rack unit is mounted on the piano body, there is a possibility that the guide members are damaged by the outer edge protrusions of the left and right music rack-holding boards hitting against portions around the guide grooves of the guide members.

SUMMARY OF THE INVENTION

It is an object of the present invention to provide a music rack unit-mounting structure of a grand piano, which makes it possible to easily mount a music rack unit on a piano body.

To attain the above object, the present invention provides a music rack unit-mounting structure of a grand piano, for removably mounting a music rack unit including a music rack and left and right music rack-holding boards arranged on left and right sides of the music rack, on a piano body of the grand piano, wherein the left and right music rack-holding boards of the music rack unit include a left-side engagement portion and a right-side engagement portion provided at outer sides of the left and right music rack-holding boards in a left-right direction and extending in a front-rear direction, respectively, wherein the piano body includes a left-side guide portion and a right-side guide portion provided with a predetermined spacing therebetween in the left-right direction, each extending in the front-rear direction, the left-side guide portion and the right-side guide portion being configured to be capable of being engaged with the left-side engagement portion and the right-side engagement portion, respectively, for guiding the left-side engagement portion and the right-side engagement portion in the front-rear direction, respectively, when the music rack unit is mounted on and removed from the piano body, wherein the left-side engagement portion and the right-side engagement portion are each formed in a protruding shape protruding outward in the left-right direction or in a recessed shape open outward in the left-right direction, wherein the left-side guide portion and the right-side guide portion are each formed in a recessed shape or a protruding shape so as to be fitted on or in an associated one of the left-side engagement portion and the right-side engagement portion, wherein rear ends of the left-side engagement portion and the right-side engagement portion are configured to be capable of being placed on respective front ends of the left-side guide portion and the right-side guide portion from above when the music rack unit is mounted on the piano body from front, and by sliding the music rack unit rearward from a state of the rear ends of the left-side and right-side engagement portions placed on the front ends of the left-side guide portion and the right-side guide portion, the music rack unit is mounted on the piano body while the left-side engagement portion and the right-side engagement portion are fitted on or in the left-side guide portion and the right-side guide portion, respectively.

With this construction, the music rack unit includes the music rack and the left and right music rack-holding boards, and the left and right music rack-holding boards have the left-side engagement portion and the right-side engagement portion formed at the outer sides thereof in the left-right direction. These left-side and right-side engagement portions are each formed in the protruding shape protruding outward in the left-right direction or in the recessed shape open outward in the left-right direction. On the other hand, the piano body is provided with the left-side guide portion and the right-side guide portion which are capable of being engaged with the left-side engagement portion and the right-side engagement portion of the music rack unit, respectively. The left-side guide portion and the right-side guide portion are each formed in the recessed shape or the protruding shape so as to be fitted on or in the associated one of the left-side engagement portion and the right-side engagement portion.

Further, the rear ends of the left-side and right-side engagement portions of the music rack unit are configured to be capable of being placed on the respective front ends of the left-side guide portion and the right-side guide portion of the piano body from above, when the music rack unit is mounted on the piano body from the front. Then, by sliding the music rack unit rearward from the placed state, the music rack unit is mounted on the piano body while the left-side engagement portion and the right-side engagement portion are fitted on or in the left-side guide portion and the right-side guide portion, respectively.

As described above, when the music rack unit is mounted on the piano body, the rear ends of the left-side engagement portion and the right-side engagement portion of the music rack unit are once placed on the respective front ends of the left-side guide portion and the right-side guide portion of the piano body from above, and the left and right rear ends of the music rack unit are supported by the front ends of the left-side guide portion and the right-side guide portion, so that differently from the conventional music rack unit, there is no need to insert the outer edge protrusions of the left and right music rack-holding boards into guide grooves from the front, and hence it is possible to easily mount the music rack unit on the piano body.

Preferably, the left-side engagement portion and the right-side engagement portion are each formed in the protruding shape protruding outward in the left-right direction, and the left-side guide portion and the right-side guide portion are each formed in the recessed shape so as to be fitted on the associated one of the left-side engagement portion and the right-side engagement portion, the front ends of the left-side guide portion and the right-side guide portion each including a first pass allowing portion open upward for allowing the rear end of an associated one of the left-side engagement portion and the right-side engagement portion to pass from above when the music rack unit is mounted on the piano body, and a first placement portion formed below the first pass allowing portion, for placing, when the music rack unit is mounted on the piano body, the rear end of the associated one of the left-side engagement portion and the right-side engagement portion in a state supporting the rear end from below.

With the construction of this preferred embodiment, the left-side engagement portion and the right-side engagement portion of the music rack unit are each formed in the protruding shape protruding outward in the left-right direction, whereas the left-side guide portion and the right-side guide portion of the piano body are each formed in the recessed shape so as to be fitted on the associated one of the left-side engagement portion and the right-side engagement portion. Further, the front ends of the left-side guide portion and the right-side guide portion of the piano body are each formed with the first pass allowing portion open upward and with the first placement portion below the first pass allowing portion.

When the music rack unit is mounted on the piano body, the rear ends of the left-side engagement portion and the right-side engagement portion of the music rack unit are brought closer to the respective front ends of the left-side guide portion and the right-side guide portion of the piano body from above. With this, the rear ends of the left-side engagement portion and the right-side engagement portion of the music rack unit pass the first pass allowing portions formed at the front ends of the left-side guide portion and the right-side guide portion of the piano body and are placed on the first placement portions from above. Thus, when the music rack unit is mounted on the piano body, the rear ends of the left-side engagement portion and the right-side engagement portion of the music rack unit can be easily placed on the first placement portions formed at the front ends of the left-side guide portion and the right-side guide portion of the piano body. By sliding the music rack unit rearward from the placed state, it is possible to easily mount the music rack unit on the piano body.

More preferably, the rear ends of the left-side engagement portion and the right-side engagement portion are each formed in a tapered shape whose vertical thickness is progressively reduced toward the rear.

With the construction of this preferred embodiment, the rear ends of the left-side engagement portion and the right-side engagement portion of the music rack unit are each formed in the tapered shape whose vertical thickness is progressively reduced toward the rear. Therefore, when the music rack unit is mounted on the piano body, the music rack unit can be smoothly slid rearward from the state in which the rear ends of the left-side engagement portion and the right-side engagement portion of the music rack unit are placed on the first placement portions of the left-side guide portion and the right-side guide portion of the piano body, and consequently it is possible to suppress occurrence of damage.

More preferably, the rear ends of the left-side engagement portion and the right-side engagement portion each have a corner between a rear end surface and a bottom surface thereof R-chamfered.

With the construction of this preferred embodiment, since the rear ends of the left-side engagement portion and the right-side engagement portion have the corners between the rear end surfaces and the bottom surfaces thereof R-chamfered, respectively, it is possible to obtain the same advantageous effects as described above, i.e. to smoothly slide the music rack unit rearward when the music rack unit is mounted on the piano body.

Preferably, the left-side engagement portion and the right-side engagement portion are each formed in the recessed shape open outward in the left-right direction, and the left-side guide portion and the right-side guide portion are each formed in the protruding shape so as to be fitted in an associated one of the left-side engagement portion and the right-side engagement portion, the rear ends of the left-side engagement portion and the right-side engagement portion each including a second pass allowing portion open downward for allowing the front end of an associated one of the left-side guide portion and the right-side guide portion, to pass from below when the music rack unit is mounted on the piano body, and a second placement portion formed above the second pass allowing portion, for being placed, when the music rack unit is mounted on the piano body, on the front end of the associated one of the left-side guide portion and the right-side guide portion in a state supported from below.

With the construction of this preferred embodiment, the left-side engagement portion and the right-side engagement portion of the music rack unit are each formed in the recessed shape open outward in the left-right direction, whereas the left-side guide portion and the right-side guide portion of the piano body are each formed in the protruding shape so as to be fitted in the associated one of the left-side engagement portion and the right-side engagement portion. Further, the rear ends of the left-side engagement portion and the right-side engagement portion of the music rack unit are each formed with the second pass allowing portion open downward and with the second placement portion above the second pass allowing portion.

When the music rack unit is mounted on the piano body, the rear ends of the left-side engagement portion and the right-side engagement portion of the music rack unit are brought closer to the respective front ends of the left-side guide portion and the right-side guide portion of the piano body from above. With this, the front ends of the left-side guide portion and the right-side guide portion of the piano body pass the second pass allowing portions formed at the rear ends of the left-side engagement portion and the right-side engagement portion of the music rack unit, thereby having the second placement portions placed thereon in a state supporting the same from below. As described above, when the music rack unit is mounted on the piano body, the second placement portions of the left-side engagement portion and the right-side engagement portion of the music rack unit can be easily placed on the front ends of the left-side guide portion and the right-side guide portion of the piano body, and by sliding the music rack unit rearward from the placed state, it is possible to easily mount the music rack unit on the piano body.

The above and other objects, features, and advantages of the present invention will become more apparent from the following detailed description taken in conjunction with the accompanying drawings.

BRIEF DESCRIPTION OF THE DRAWINGS

FIGS. 1A and 1B are views of a music rack unit to which is applied a music rack unit-mounting structure according to an embodiment of the present invention and left and right music rack guide members mounted on a piano body, in which FIG. 1A shows a state as viewed from the front and obliquely above and FIG. 1B shows a state as viewed from the rear and obliquely above;

FIGS. 3A to 3C are views useful in sequentially explaining operations for mounting the music rack unit on the piano body, in which FIG. 3A shows a state in which the music rack unit is brought closer to the left and right music rack guide members from the front, FIG. 3B shows a state in which a rear end of the music rack unit is placed on front ends of the left and right music rack guide members, and FIG. 3C shows a state in which the music rack unit is slid rearward and is thereby mounted on the piano body;

FIGS. 4A to 4C are views useful in explaining engagement states between the left and right music rack-holding boards and associated ones of the left and right music rack guide members, during the operations for mounting the music rack unit on the piano body, in which FIGS. 4A to 4C show respective engagement states therebetween corresponding to FIGS. 3A to 3C;

DETAILED DESCRIPTION OF PREFERRED EMBODIMENTS

Figure 1A:
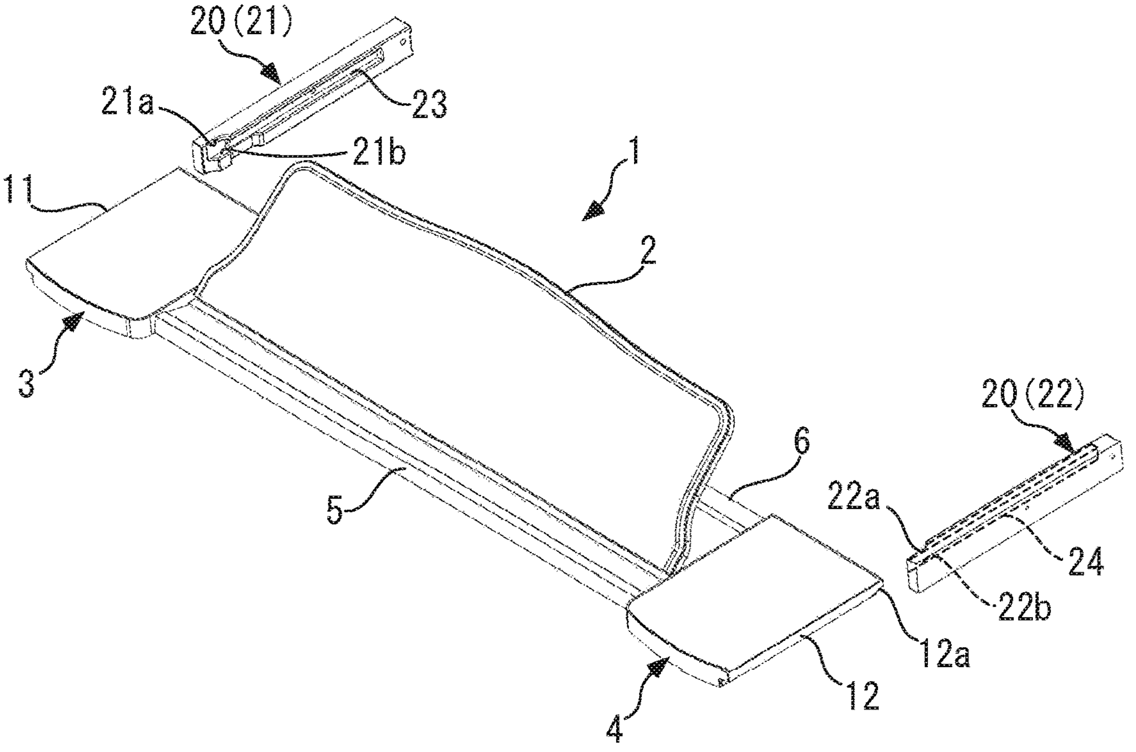
Figure 1B:
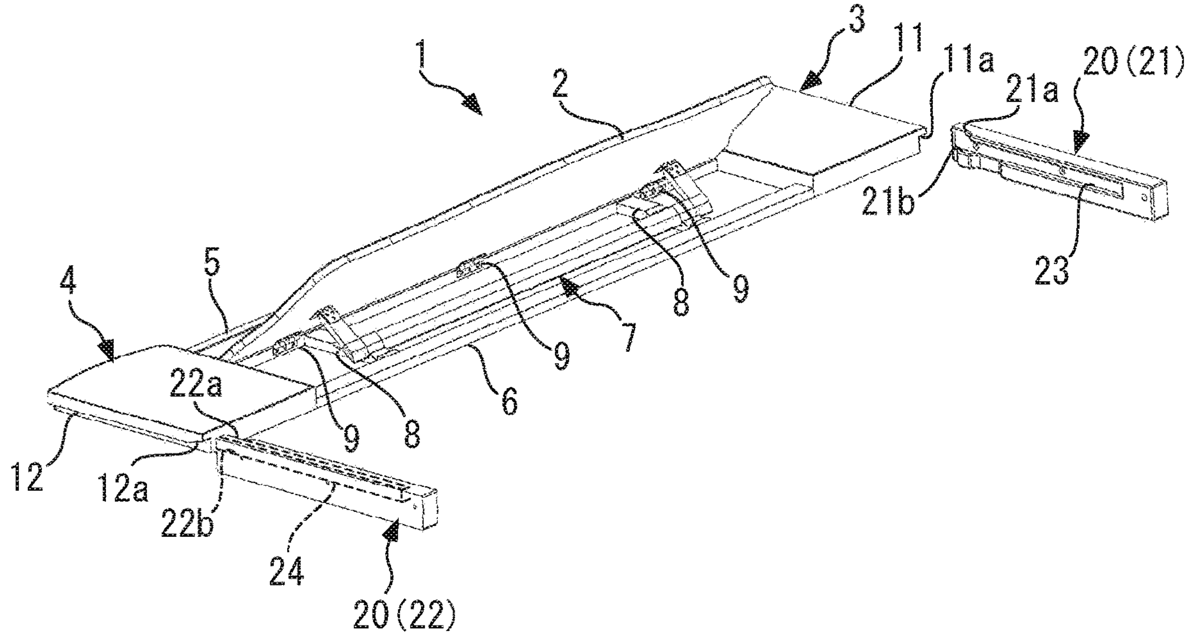
Figure 2A:
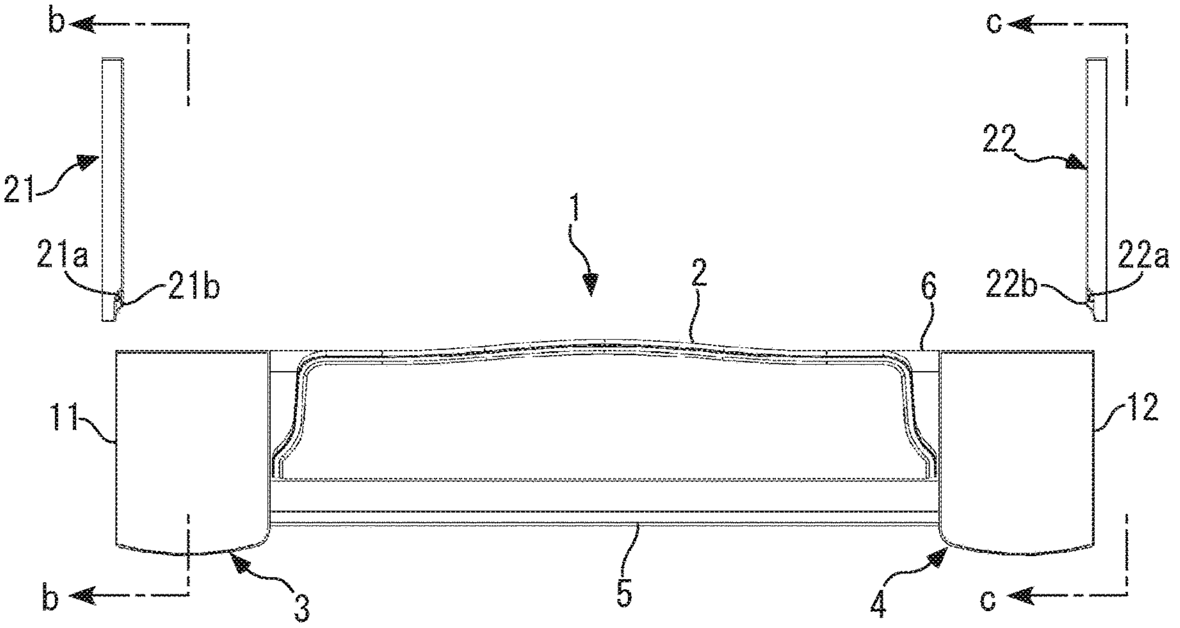
FIG. 2A is a plan view of the music rack unit and the left and right music rack guide members shown in FIGS. 1A and 1B, FIGS. 2B and 2C are partial perspective views taken along line b-b and line c-c of FIG. 2A, respectively.
Figure 2B:
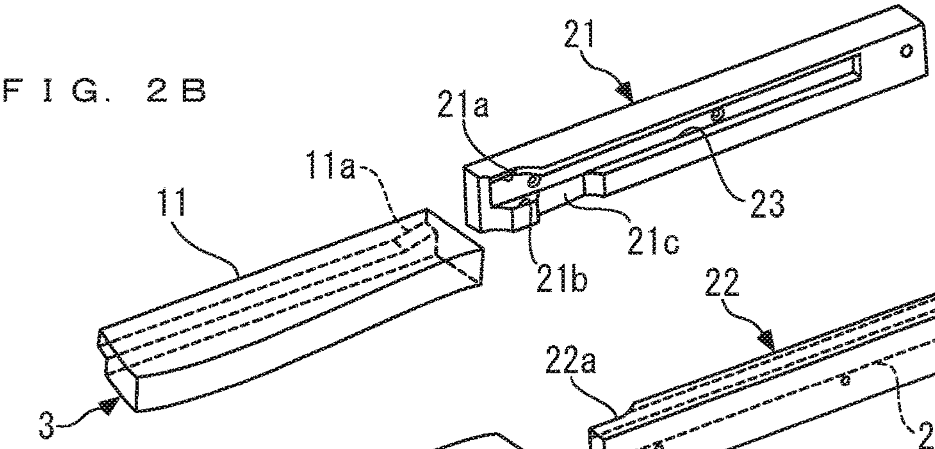
FIG. 2D is a view useful in explaining an outer end of each of left and right music rack-holding boards.
Figure 2C:
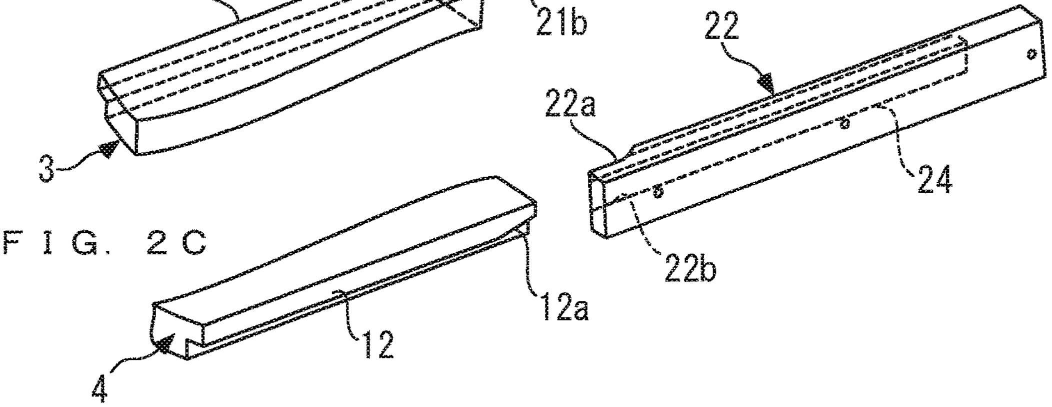

The present invention will now be described in detail with reference to the drawings showing preferred embodiments thereof. FIGS. 1A and 1B show a music rack unit 1 to which is applied a music rack unit-mounting structure according to an embodiment of the present invention, and two (left and right) music rack guide members 20 and 20 mounted on a piano body (not shown). FIG. 1A shows a state as viewed from the front and obliquely above and FIG. 1B shows a state as viewed from the rear and obliquely above. Further, FIG. 2A is a plan view of the music rack unit 1 and the two music rack guide members 20 and 20, and FIGS. 2B and 2C are partial perspective views taken along line b-b and line c-c of FIG. 2A, respectively.

As shown in FIGS. 1A and 1B, the music rack unit 1 is comprised of a music rack 2 formed as a laterally elongated plate, two (left and right) music rack-holding boards 3 and 4 arranged on the left and right sides of the music rack 2, two (front and rear) music rack-holding bars 5 and 6 which are fixed between the left and right music rack-holding boards 3 and 4, extend in a left-right direction, and are disposed with a predetermined distance therebetween in a front-rear direction, a music rack prop 7 pivotally mounted on a rear side of the music rack 2, and two (front and rear) latching base pieces 8 and 8 fixed between the front and rear music rack-holding bars 5 and 6 such that the front and rear latching base pieces 8 and 8 extend in the front-rear direction, for latching the music rack prop 7. Note that although these components are basically made of wood, it is also possible to form them by employing a composite material of wood and synthetic resin.

The music rack 2 has a lower end thereof pivotally mounted on a rear end of the front-side music rack bar 5 via a plurality of hinges 9. Further, each latching base piece 8 has a plurality of latching portions formed in a longitudinal direction thereof for latching the music rack prop 7. The music rack prop 7 is latched by one of the latching portions of each latching base piece 8, whereby it is possible to adjust a standing angle of the music rack 2. Note that by folding the music rack prop 7 horizontally, the music rack 2 is placed in a position horizontal and substantially flush with the left and right music rack-holding boards 3 and 4.

The left and right music rack-holding boards 3 and 4 are each formed symmetrically and has a rectangular shape in plan view with a predetermined thickness. The left-side music rack board 3 is provided with a left protruding engagement portion 11 (left-side engagement portion) which has a protruding shape protruding leftward from a left-side edge of the left-side music rack board 3 by a predetermined length and extends in a front-rear direction. Note that the left protruding engagement portion 11 is formed such that an upper half portion of a left-side end thereof protrudes, by cutting off a lower half portion of a left-side end of the left-side music rack board 3.

Figure 2D:
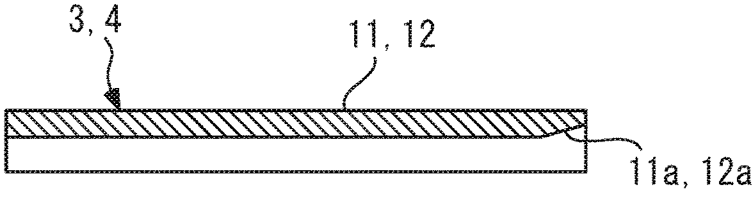

Further, as shown in FIGS. 2B and 2D, the left protruding engagement portion 11 has a rear end thereof progressively reduced in a vertical thickness toward the rear, whereby a bottom portion of the rear end is formed with a tapered surface 11*a* which is inclined such that the tapered surface 11*a* becomes higher as it extends rearward. Note that, although omitted from illustration, the above-described left protruding engagement portion 11 of the left-side music rack board 3 has a felt attached to the whole of a lower surface and a left-side surface thereof. With this, it is possible to prevent noise from being generated not only when the music rack unit 1 is mounted on and removed from the piano body but also by vibration from the piano body during musical performance.

On the other hand, the right-side music rack board 4 is provided with a right protruding engagement portion 12 (right-side engagement portion) which has a protruding shape protruding rightward from a right-side edge of the right-side music rack board 4 by a predetermined length and extends in the front-rear direction. Similar to the above-described left protruding engagement portion 11, the right protruding engagement portion 12 is formed such that an upper half portion of a right-side end thereof protrudes, by cutting off a lower half portion of a right-side end of the right-side music rack board 4. In addition, the right-side music rack board 4 has a rear end thereof progressively reduced in a vertical thickness toward the rear, and a bottom portion of the rear end is formed with a tapered surface 12*a* which is inclined such that tapered surface 12*a* becomes higher as it extends rearward.

As shown in FIGS. 1A and 1B and FIGS. 2A to 2D, the two (left and right) music rack guide members 20 and 20 are provided not only for guiding the music rack unit 1 in the front-rear direction while supporting the music rack unit 1 from the left and the right when the music rack unit 1 is mounted on and removed from the piano body but also for holding the music rack unit 1 in a state mounted on the piano body. These music rack guide members 20 and 20 are mounted on the front ends of inner surfaces of side panels (not shown) of the piano body such that the music rack guide members 20 and 20 are opposed to each other in the left-right direction with a predetermined distance therebetween. Note that in the following description, the two (left and right) music rack guide members 20 and 20 will be referred to as "the left guide member 21" and "the right guide member 22", respectively, as deemed appropriate.

As shown in FIGS. 2A to 2D, the left guide member 21 and the right guide member 22 each have a substantially symmetrical shape. Specifically, the guide members 21 and 22 are each formed into a block shape which extends a predetermined length in the front-rear direction, and include respective recessed guide grooves 23 and 24 which open toward the inside and front of the piano body and extend a predetermined length in the front-rear direction.

Further, the left guide member 21 and the right guide member 22 have front ends thereof formed with upper-side pass allowing portions 21*a* and 22*a* (first pass allowing portions), respectively, which allow rear ends of the left protruding engagement portion 11 and the right protruding engagement portion 12 associated with the left guide member 21 and the right guide member 22, respectively, to pass from above when the music rack unit 1 is mounted on the piano body. Further, the left and right guide members 21 and 22 have the front ends thereof formed with lower-side placement portions 21*b* and 22*b* (first placement portions), respectively, for placing the rear ends of the left and right protruding engagement portions 11 and 12 associated with the left and right guide members 21 and 22, respectively, in a state supporting the rear ends from below.

Note that although the left guide member 21 has a recess 21*c* formed rearward of the lower-side placement portion 21*b* as shown in FIG. 2B, the recess 21*c* is for preventing interference of a tuning tool during tuning of strings on a low-pitched sound side of the piano. Further, the recess described above is not formed in the right guide member 22.

Next, operations for mounting the music rack unit 1 on the piano body will be described with reference to FIGS. 3A to 3C and FIGS. 4A to 4C. Note that FIGS. 4A to 4C each show a collective representation of the left and right music rack-holding boards 3 and 4 and the guide members 21 and 22.

Figure 3A:
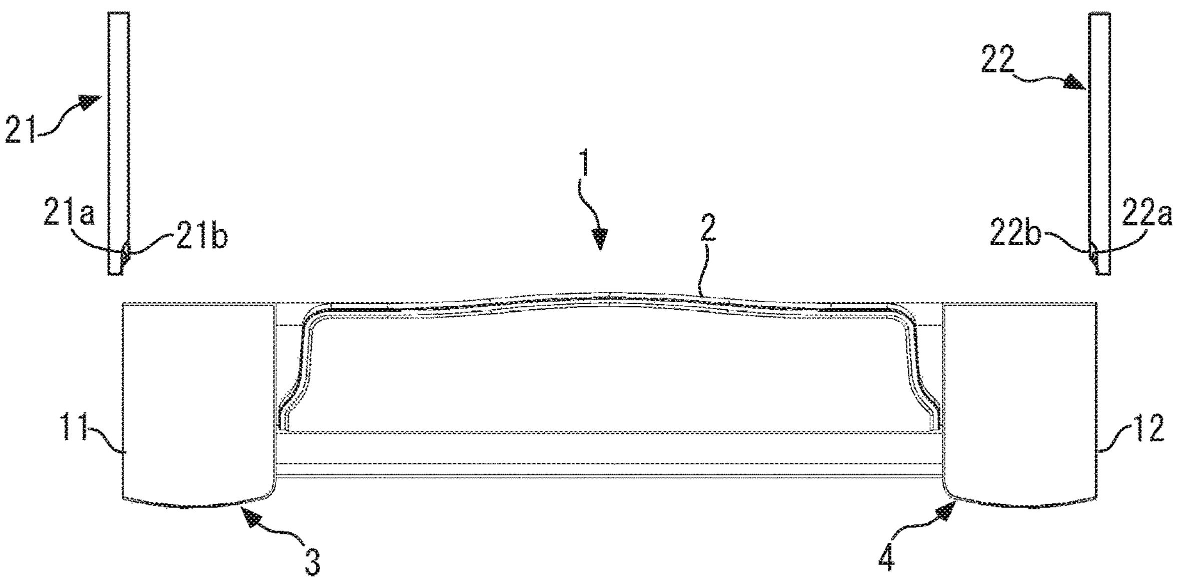
Figure 3B:
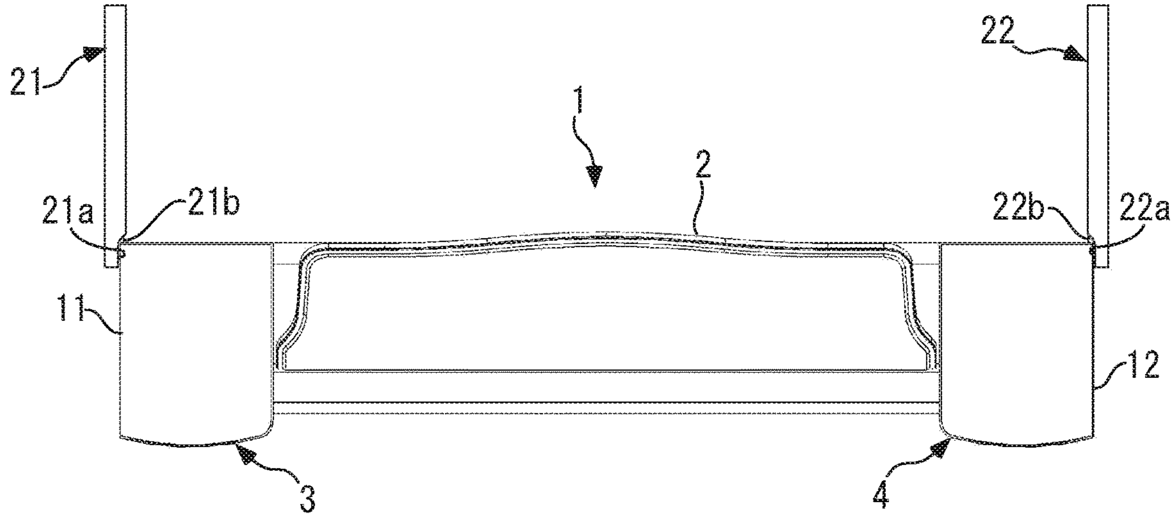
Figure 4A:
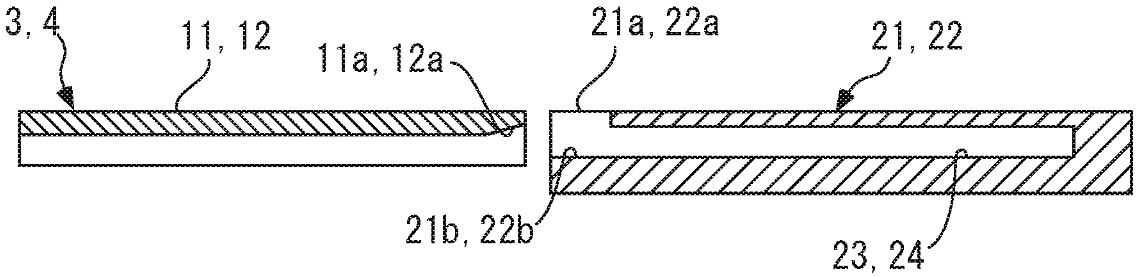
Figure 4B:
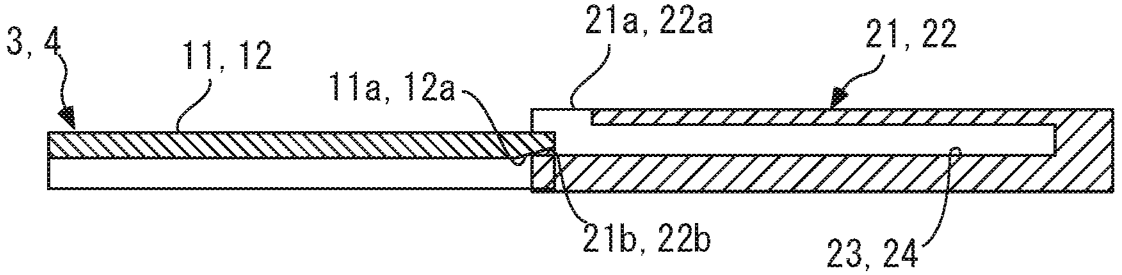

When the music rack unit 1 is mounted on the piano body, first, as shown in FIGS. 3A and 4A, the music rack unit 1 is brought closer to the left and right music rack guide members 21 and 22 from the front while being held substantially horizontally. Then, as shown in FIGS. 3B and 4B, the rear ends of the left protruding engagement portion 11 and the right protruding engagement portion 12 of the music rack unit 1 are placed on the respective front ends of the left guide member 21 and the right guide member 22 from above.

More specifically, the rear ends of the left protruding engagement portion 11 and the right protruding engagement portion 12 are brought closer to the respective front ends of the left guide member 21 and the right guide member 22 from above. This causes the rear ends of the left and right protruding engagement portions 11 and 12 to pass the respective upper-side pass allowing portions 21*a* and 22*a* formed at the front ends of the left and right guide members 21 and 22, and the tapered surfaces 11*a* and 12*a* of the left and right protruding engagement portions 11 and 12 are placed on the lower-side placement portions 21*b* and 22*b*, respectively.

Figure 3C:
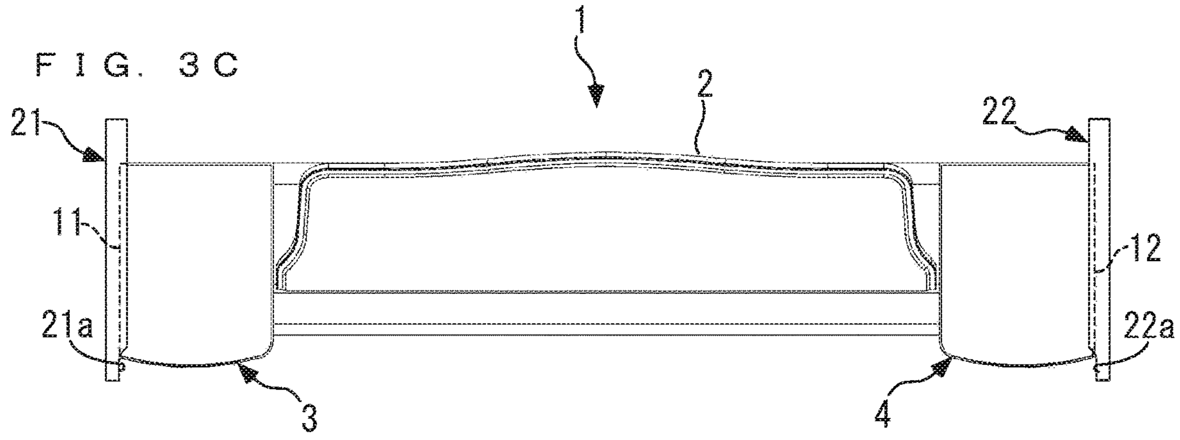
Figure 4C:
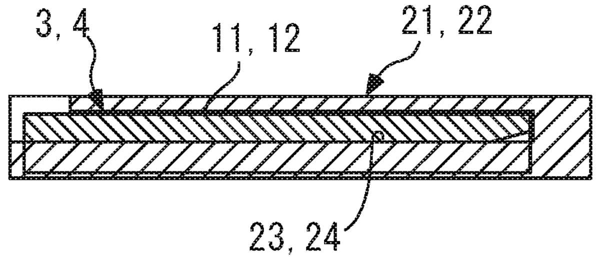

Then, the music rack unit 1 is slid rearward, whereby as shown in FIGS. 3C and 4C, the left protruding engagement portion 11 and the right protruding engagement portion 12 of the music rack unit 1 are engaged with the respective guide grooves 23 and 24 of the left and right guide members 21 and 22 in a state fitted therein. Thus, the music rack unit 1 is mounted on the piano body in a state supported by the left guide member 21 and the right guide member 22 from the left and the right. Note that when removing the music rack unit 1 from the piano body, it is possible to easily remove the same from the piano body by pulling it out forward.

As described hereinabove, according to the present embodiment, when the music rack unit 1 is mounted on the piano body, the rear ends of the left protruding engagement portion 11 and the right protruding engagement portion 12 of the music rack unit 1 can be once placed on the respective lower-side placement portions 21*b* and 22*b* formed at the front ends of the left guide member 21 and the right guide member 22 of the piano body, and by sliding the music rack unit 1 rearward from the placed state, it is possible to easily mount the music rack unit 1 on the piano body.

Figure 5:
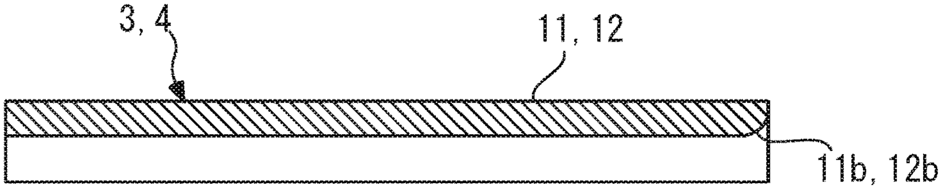
FIG. 5 is a view useful in explaining a variation of a rear end of each of the left and right music rack-holding boards.

Further, since the rear ends of the left and right protruding engagement portions 11 and 12 are formed to be reduced in thickness toward the rear, thereby being provided with the tapered surfaces 11*a* and 12*a* inclined to become higher as they extend rearward, it is possible to smoothly slide the music rack unit 1 rearward, so that it is possible to suppress occurrence of damages. Note that the tapered surfaces 11*a* and 12*a* formed at the rear ends of the left and right protruding engagement portions 11 and 12 may be replaced by R-chamfered portions 11*b* and 12*b*, e.g. as shown in FIG. 5, which are formed at respective corners of the rear ends formed by perpendicular rear end surfaces and horizontal bottom surfaces of the left and right protruding engagement portions 11 and 12. In this case as well, it is possible to obtain the same advantageous effects as obtained by the case where the tapered surfaces 11*a* and 12*a* are formed.

Note that although in the above-described music rack unit 1 and two music rack guide members 20 and 20, the left and right opposite ends of the music rack unit 1 are each formed in the protruding shape and the two music rack guide members 20 and 20 are formed with the recessed guide grooves 23 and 24, it is also possible to invert the protrusion-recess relationship between the left and right opposite ends of the music rack unit 1 and the two music rack guide members.

Figure 6:
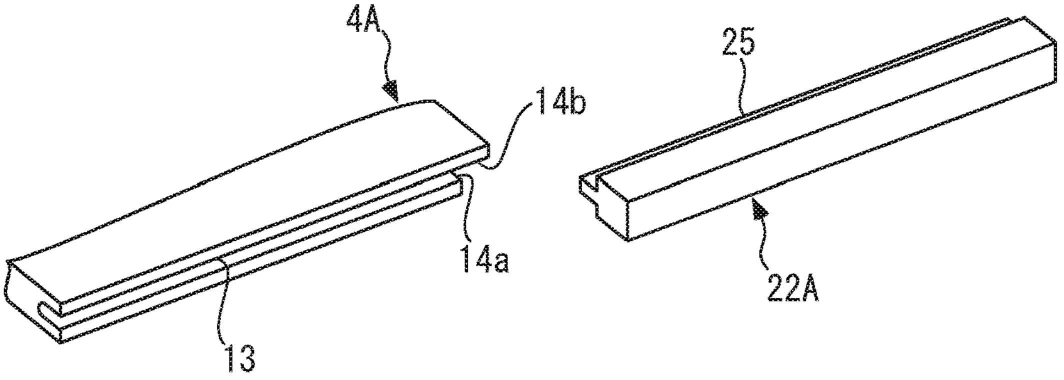
FIG. 6 is a view useful in explaining another music rack unit-mounting structure of the present invention.

FIG. 6 corresponds to FIG. 2C and shows a right end of a right-side music rack board 4A and a right guide member 22A of the music rack unit 1. As shown in FIG. 6, this music rack board 4A has a right-side edge thereof formed with a recessed engagement groove 13 (right-side engagement portion) which opens rightward and rearward and extends in the front-rear direction. Further, the right-side edge of the music rack board 4A has a rear end thereof provided with a lower-side pass allowing portion 14*a* (second pass allowing portion) open downward, and an upper-side placement portion 14*b* (second placement portion) formed above the lower-side pass allowing portion 14*a*. On the other hand, the right guide member 22A has a protruding guide 25 which extends in the front-rear direction and protrudes leftward. Note that although omitted from illustration, the music rack unit 1 including the above-described right-side music rack board 4A has a left-side music rack board formed symmetrically with the right-side music rack board 4A, and has a left guide member formed symmetrically with the right guide member 22A.

Figure 7A:
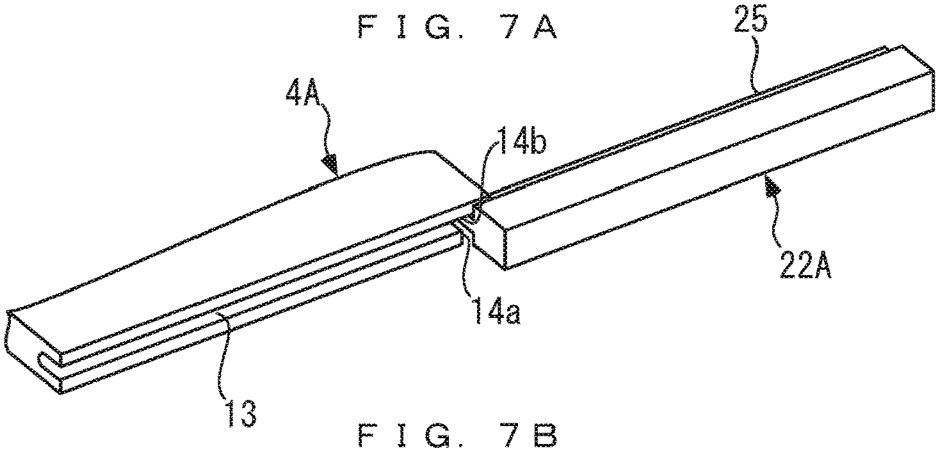
FIGS. 7A and 7B are views useful in explaining operations for mounting the music rack unit shown in FIG. 6 on the piano body.
Figure 7B:
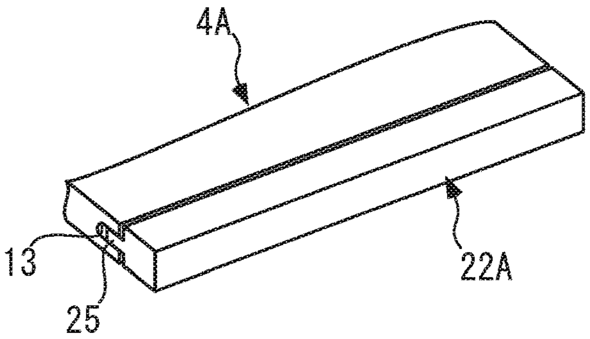

When the above-described music rack unit 1 is mounted on the piano body, a right-side rear end of the music rack board 4A is brought closer to a front end of the right guide member 22A from above. With this, as shown in FIG. 7A, a front end of the protruding guide 25 of the right guide member 22A passes the lower-side pass allowing portion 14*a* of the music rack board 4A and has the upper-side placement portion 14*b* placed thereon in a state supporting the same from below. Then, the music rack unit 1 is slid rearward from the placed state, whereby as shown in FIG. 7B, the engagement groove 13 of the right-side music rack board 4A is fitted on the protruding guide 25 of the right guide member 22A, and the music rack unit 1 is mounted on the piano body.

Note that details of the constructions of the music rack unit 1 shown in the embodiments are given only by way of example, and they can be modified as appropriate within the scope of the subject matter of the present invention.

It is further understood by those skilled in the art that the foregoing are preferred embodiments of the invention, and that various changes and modifications may be made without departing from the spirit and scope thereof.

What is claimed is:

1. A music rack unit-mounting structure of a grand piano, for removably mounting a music rack unit including a music rack and left and right music rack-holding boards arranged on left and right sides of the music rack, on a piano body of the grand piano, wherein the left and right music rack-holding boards of the music rack unit include a left-side engagement portion and a right-side engagement portion provided at outer sides of the left and right music rack-holding boards in a left-right direction and extending in a front-rear direction, respectively, wherein the piano body includes a left-side guide portion and a right-side guide portion provided with a predetermined spacing therebetween in the left-right direction, each extending in the front-rear direction, the left-side guide portion and the right-side guide portion being configured to be capable of being engaged with the left-side engagement portion and the right-side engagement portion, respectively, for guiding the left-side engagement portion and the right-side engagement portion in the front-rear direction, respectively, when the music rack unit is mounted on and removed from the piano body, wherein the left-side engagement portion and the right-side engagement portion are each formed in a protruding shape protruding outward in the left-right direction or in a recessed shape open outward in the left-right direction, wherein the left-side guide portion and the right-side guide portion are each formed in a recessed shape or a protruding shape so as to be fitted on or in an associated one of the left-side engagement portion and the right-side engagement portion, wherein rear ends of the left-side engagement portion and the right-side engagement portion are configured to be capable of being placed on respective front ends of the left-side guide portion and the right-side guide portion from above when the music rack unit is mounted on the piano body from front, and by sliding the music rack unit rearward from a state of the rear ends of the left-side and right-side engagement portions placed on the front ends of the left-side guide portion and the right-side guide portion, the music rack unit is mounted on the piano body while the left-side engagement portion and the right-side engagement portion are fitted on or in the left-side guide portion and the right-side guide portion, respectively.

2. The music rack unit-mounting structure according to claim 1, wherein the left-side engagement portion and the right-side engagement portion are each formed in the protruding shape protruding outward in the left-right direction, wherein the left-side guide portion and the right-side guide portion are each formed in the recessed shape so as to be fitted on the associated one of the left-side engagement portion and the right-side engagement portion, and wherein the front ends of the left-side guide portion and the right-side guide portion each include:

a first pass allowing portion open upward for allowing the rear end of an associated one of the left-side engagement portion and the right-side engagement portion to pass from above when the music rack unit is mounted on the piano body, and a first placement portion formed below the first pass allowing portion, for placing, when the music rack unit is mounted on the piano body, the rear end of the associated one of the left-side engagement portion and the right-side engagement portion in a state supporting the rear end from below.

3. The music rack unit-mounting structure according to claim 2, wherein the rear ends of the left-side engagement portion and the right-side engagement portion are each formed in a tapered shape whose vertical thickness is progressively reduced toward the rear.

4. The music rack unit-mounting structure according to claim 2, wherein the rear ends of the left-side engagement portion and the right-side engagement portion each have a corner between a rear end surface and a bottom surface thereof R-chamfered.

5. The music rack unit-mounting structure according to claim 1, wherein the left-side engagement portion and the right-side engagement portion are each formed in the recessed shape open outward in the left-right direction, wherein the left-side guide portion and the right-side guide portion are each formed in the protruding shape so as to be fitted in an associated one of the left-side engagement portion and the right-side engagement portion, and wherein the rear ends of the left-side engagement portion and the right-side engagement portion each include:

a second pass allowing portion open downward for allowing the front end of an associated one of the left-side guide portion and the right-side guide portion, to pass from below when the music rack unit is mounted on the piano body, and a second placement portion formed above the second pass allowing portion, for being placed, when the music rack unit is mounted on the piano body, on the front end of the associated one of the left-side guide portion and the right-side guide portion in a state supported from below.

* * * * *